United States Patent [19]

Kaschper

[11] Patent Number: 4,955,839
[45] Date of Patent: Sep. 11, 1990

[54] OAR FOR RACING SHELLS AND METHOD OF MAKING SAME

[75] Inventor: Jürgen R. Kaschper, London, Canada

[73] Assignee: Big Creek Sports Ltd.

[21] Appl. No.: 292,892

[22] Filed: Jan. 3, 1989

[30] Foreign Application Priority Data

Jan. 25, 1988 [CA] Canada .................................. 557414

[51] Int. Cl.$^5$ ............................................ B63H 16/04
[52] U.S. Cl. ...................................... 440/101; 416/74
[58] Field of Search ............... 440/101; 416/69, 70 R, 416/74, 229 R, 230; 264/257, 258, 279.1; 156/192, 245

[56] References Cited

U.S. PATENT DOCUMENTS

| 4,124,670 | 11/1978 | Cecka et al. | 264/257 X |
| 4,383,955 | 5/1983 | Rubio et al. | 264/257 X |
| 4,610,633 | 9/1986 | Freudenberg | 440/101 |

FOREIGN PATENT DOCUMENTS

| 280728 | 1/1913 | United Kingdom | 416/74 |
| 674435 | 4/1939 | United Kingdom | 416/70 |
| 1350103 | 4/1974 | United Kingdom | 440/101 |
| 2038749 | 7/1980 | United Kingdom | 440/101 |

OTHER PUBLICATIONS

Materials Engineering, 1984 Top Twenty Award–Nov. 1984, pp. 40 and 41.
Modern Plastics, Mar. 1985, page No. unknown.
Thermal Expansion Transfer Molding–Tertm Inc., Jan. 31/1985, consisting of 4 pages.

Primary Examiner—Sherman Basinger
Attorney, Agent, or Firm—Mitches & Co.

[57] ABSTRACT

A resin and transfer molding technique is used to fabricate, in a unitary fashion, a synthetic oar that has as a core, polyurethane and a longitudinal rigid rectangular spline preferably sitka spruce which transverses orthogonally and extends along the longitudinal axis of the shaft of the oar, the shaft handle therefore and opposite paddle end being unitarily molded according to the resin transfer molding technique. Prior to such molding a green oar substructure is made of the shaft and handle on the one hand, and the paddle on the other hand where a multi-layer wrap of synthetic material is formed over the spline in relation to the shaft and in the paddle mold in relation to the paddle and the cavities are cores thereof filled with green polyurethane. The two components so formed, being the green paddle, and the green shaft, are merged together and further wraps of synthetic material overlaid. The enwrapped overlayed green oar is placed in the resin transfer mold wherein a thermo-setting resin is inserted, the mold elevated to a curing temperature, and the complete oar fabricated. On cooling it is removed and the outside surface finished as required.

21 Claims, 6 Drawing Sheets

OAR FOR RACING SHELLS AND METHOD OF MAKING SAME

BACKGROUND OF THE INVENTION

This invention relates to a novel oar construction and to a novel method of making the same.

Oars that are used in rowing are of various sizes depending on their ultimate use; that is, whether they are used for one, two, four, or an eight man scull.

Originally, such oars were exclusively made of wood. More recently synthetic materials have been used to reduce the weight and to enhance the lifetime of the oar. Such synthetic materials typically include plastics, fiberglass, compositions of carbon fibres and thread.

Each of the prior art oars have deficiencies. The wooden oars are heavy and cumbersome to handle and are made from various pieces of wood sliced and laminated together. Water has a tendency to impregnate the wood by eating away at the protective finish and the oar rots and fails. Plastic, fiberglass and composite oars are generally made of two or more, generally, three discrete pieces: the paddle, the shaft, and the handle. Each of these pieces is made independently of the other and then the three pieces are assembled after fabrication to form the complete oar. The resulting joints at the handle and blade, when stressed during use, tend to separate and eventually fall apart. The fact that the blade and the shaft are separately made does not permit a transitional zone to be formed so as to improve hydrodynamic features of the external profile. Similar stress problems are related to the joint between shaft and handle.

SUMMARY OF THE INVENTION

I have conceived of a new oar construction which makes a single unitary oar possible, that is, a unitary oar including a paddle transforming smoothly into a shaft that preferably has a larger cross-sectional diameter at its centre than at either of its opposite ends and thence tapers from the paddle toward the midpoint as an ever increasing cross-sectional area, with a flat bottom and circular top and hence as an oblate ellipse, and thence from the midpoint toward the handle similarly profiled but with ever decreasing cross-sectional area and then transforming into a tapered cylindrical piece that underlines a handle gripping surface all as a single unitary member. Dimensions of 10 feet to 13 feet (3 meters–4.5 meters) are possible; and, oar structures or profiles specifically suited for rowing can easily be achieved.

The novel oar employs the use of a new resin transfer molding technique wherein a resin transfer mold is made of the ultimate outside configuration or design shape of the desired oar. The oar is assembled by using an inner polyurethane foam core and enwrapping the same with an outer skin of various synthetic tapes and materials, of fiberglass, graphite and the like in a manner as will be explained, so as to form a green oar. The green oar is placed within the resin transfer mold. The mold is closed and thermo-expanding resin is transferred into the oar mold cavity while perging it of air. This is done under pressure so that the resin seeps into the various layers of synthetic tapes and materials so as to form a unitary cohesive mass. Once filled with resin, the exterior of the resin transfer mold is elevated in temperature and this causes the thermo-expanding resin embodying the green oar to rise in temperature and to cure into a hard outer skin binding the plurality of resin impregnated enwrapping materials and bonding them together. After an appropriate curing time, the unitary oar is cooled and then removed from the mold. Any flashing is sanded away.

The invention will now be described in the following fashion.

The invention therefore contemplates an oar including a paddle transforming into a shaped shaft that at its opposite end carries a handle portion comprising a shaped paddle having a concave front surface and convex back that at its upper end smoothly merges with a shaft portion that has a thickness which increases toward the longitudinal center of the shaft and then decreases toward the shafts distal end and defines a handle portion and a gripping surface thereover, the shaft in section, throughout the handle portion being a cylinder; the oar including;

(a) a smooth outer skin of resin impregnated fiberglass tape and cloth and graphite tow encircling;

(b) an inner core of polyurethane foam that carries in the longitudinal direction and coincident with the longitudinal axis of the paddle a rib member extending essentially from the paddle throughout the extent of the shaft and handle.

Particularly the invention contemplates that the oar have a tapered handle portion, and a shaft portion which tapers from its center toward the paddle portion as an oblate sphere and also as an oblate sphere ever smaller toward the handle until it merges with the handle that preferably is shaped in cross-section as a tapered cylinder.

More particularly the oar in the preferred configuration has an outer skin composed of resin that impregnates synthetic wound and wrapped materials.

The invention also contemplates a method of making the composite unitary oar having a shaft and paddle and suitable for use in scull racing comprising:

(a) selecting a first and second core mold;
  (i) the first core mold comprising two pieces jointly defining a cavity configured into the exterior profile of the shaft of the oar; and
  (ii) the second core mold having two pieces jointly configured to define a cavity for the paddle of the oar;

(b) selecting as a first and a third layer, a fiberglass fabric and as a second layer carbon tow cloth;

(c) layering said first, second and third cloths and fabric into the core cavities of a piece of the first and second core molds;

(d) selecting polyurethane foam and pouring the same into each of said partial cavities over the first, second and third layers;

(e) selecting a longitudinal rigid member as a spline and placing the same over one of said pieces of the first core mold;

(f) sandwiching the respective pieces of the core molds together so that the first core mold sandwiches the spline therebetween and allowing each core mold to cure its respective contents and to respectively create a green paddle or green shaft;

(g) removing the green paddle from its core mold and green shaft from its core mold;

(h) removing mold flashings from the green paddle and green shaft;

(i) abutting the green paddle and green shaft together and enwrapping the same end to end with helical winds of synthetic material to form a unitary green oar;

(j) placing the green oar into a resin transfer mold whose cavity is configured for the ultimate exterior profile of the oar;

(k) selecting a thermo-setting resin and injecting the same into the resin transfer mold; and, (l) elevating the temperature of the resin transfer mold to cure the resin and to create a unitary oar with shaft and integral paddle.

Particularly the exterior surface of the oar after fabrication is coated with a resin and the same is eventually allowed to cure; but, sprinkling saw dust over the handle portion of the shaft while the resin is wet impregnates the saw dust and thereafter on drying of the resin binds the saw dust to the underlying hardened resin to thereby create a pebbly surface in the handle portion and a smooth surface along shaft and paddle portion of the oar.

BRIEF DESCRIPTION OF THE DRAWINGS

The invention will now be described by way of example and reference to the accompanying drawings in which.

DESCRIPTION OF THE PREFERRED EMBODIMENTS

Figure 1:
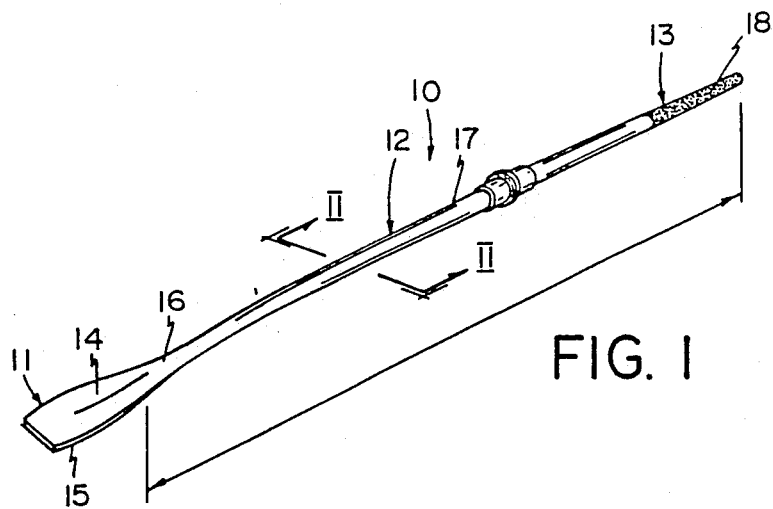
FIG. 1 is a perspective view of a novel unitary oar made according to the invention.

Referring to FIG. 1, the unitary oar, according to the invention is shown as 10 and includes a blade or paddle 11 integral with a shaft 12 that transforms at its other end into a handle 13. The blade 11 has a concave face 14 and a convex back 15 that are essentially curved sheets and that respectively merge with the shaft 12 and its lower extremity 16 where the circumference of the shaft 12 there is smaller than at the central or midpoint 17 of the shaft 12. The shaft 12 tapers from the central midpoint 17 to a smaller circumference at its opposite end where it transforms into the handle portion 13. Overlaying the handle portion 13 is a treated gripping surface 18 for enhanced gripping and preferably is of a pebbly surfaced texture.

Figure 2:
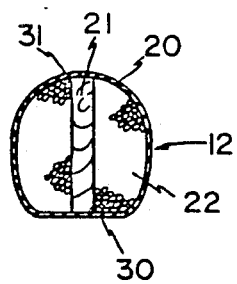
FIG. 2 is a typical cross-section through the tapered shaft of the oar along II—II of FIG. 1.
Figure 3:
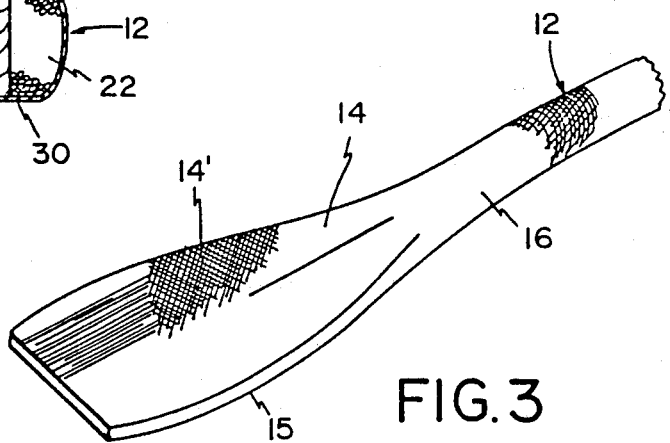
FIG. 3 is a perspective view of the blade-shaft interface according to the invention.

FIG. 2 shows the shaft 12 near its midpoint 17, in section. The shaft 12 consists of a multi-layered skin 20, a longitudinal rib member or spline 21 of rigid material preferably wood; particularly preferred is sitka spruce which is placed so that it is coincident to the longitudinal axis of the oar 10 and is orthogonal to the curved sheet surfaces of the face 14 and back 15 of the paddle 11. Interspaced between the wooden spline 21 and the surrounding wrap or skin 20 is polyurethane foam 22 that is pre-formed, in a manner as will become apparent, so as to become a semi-rigid porous core mass occupying the plenum defined by the skin 20 and spline 21.

The skin 20 is more particularly seen in FIG. 4 and comprises a number of various layers of synthetic material preferably three fabric wraps and an exterior resin coating that will be described hereafter.

Figure 6:
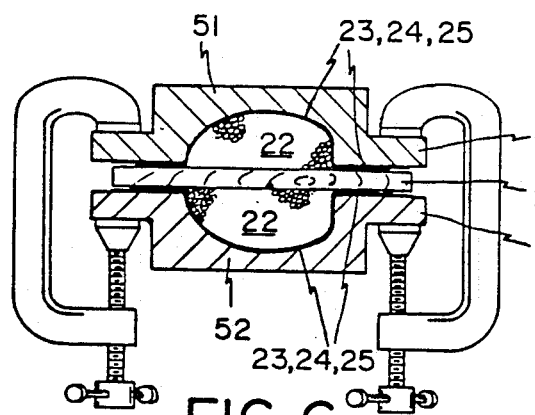
FIG. 6 is a section through the core mold of FIG. 5 after assembly.

Prior to describing these layers, it should be noted that the cross-sectional configuration of the oar shaft, now referring to FIG. 6, is such that orthogonal to the sitka spruce wooden spline 21, the shaft 12 depicts a flat base 30 that slowly reversely curves so that the upper arcuate portion 31 of the shaft is essentially rounded. In other words, the cross-sectional configuration is more like a compound oblate ellipse with the spline 21 oriented to be coincident with the common major axis thereof while also orthogonal with the prolongation and the front and back surfaces 14 and 15 of the paddle 11. The base 30 merges, as is seen from the figures, with the back 15 of the paddle 11.

Adjacent to the sitka spruce spline 21, and on opposite lateral sides thereof is the polyurethane foam 22. It is a polyurethane foam known as MIA FOAM 9200 TM, supplied by the firm MIA CHEMICAL LIMITED of Rexdale, Ontario, Canada that fills the plenum or cavity that is defined by the spline 21 and the outer skin 20.

Figure 4:
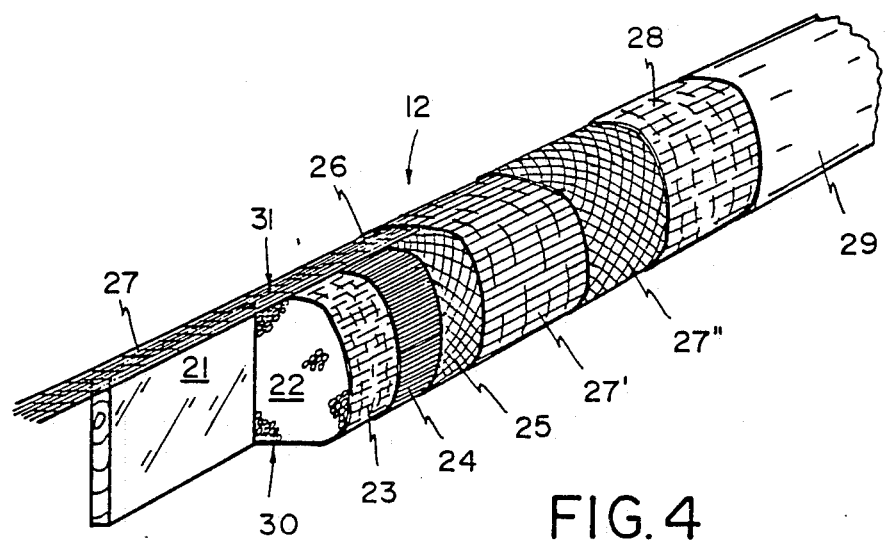
FIG. 4 is an assembly view, partially broken away, of the internal structure of the shaft of the oar.
Figure 5:
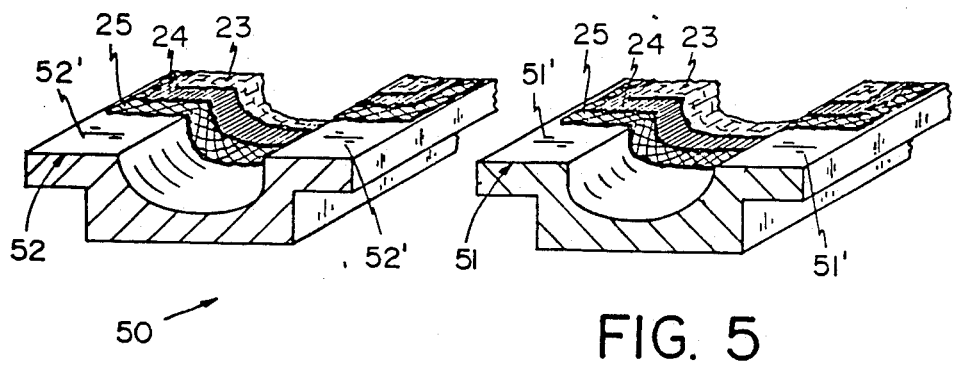
FIG. 5 is a perspective view of an open core mold used for fabricating the shaft.

Referring to FIG. 4, the shaft portion 12 comprises, beside the central core mass of foam 22 and the longitudinal sitka spline 21, a plurality of longitudinally layered wraps 23, 24, 25, 26, 27, and 28 that together are assembled into a unitary green oar composite as will be described with reference to FIGS. 5, 6 and 11. Suffice it to say for the present, the polyurethane porous core 22 is enwrapped firstly with the three layers 23, 24 and 25, the first layer 23 and the third layer 25 both being of woven fiberglass of approximately six ounces, while the second and intermediate layer 24 is a graphite tow or cloth. After this has been assembled, in a manner to be one of the three constituent components of the "green oar" and as will later be described with reference to FIGS. 10 and 11, a top longitudinal run of a woven graphite fabric or tow 26 is placed to encover the bottom and top edges of the sitka spruce spline 21. Thereafter helical winds of a fifth wrap shown as 27' and being a uni-directional fiberglass cloth that is helically wound from the handle end to the paddle, as will be hereinafter described; and then a sixth layer 27" of fiberglass cloth helically wound and then a seventh layer 28 of the same fiberglass cloth helically wound from handle end to paddle tip. A thermo-setting resin 29 encapsulates and impregnates all the wraps 23 through 28 to bind them with the foam core 22. It may be said therefore that the outer skin 20 consists of the layers 23 through to and including 29.

The shaft 12 is fabricated in the following manner. Referring to FIG. 5, a core mold is generally shown as 50 and consists of two halves 51 and 52 with a cavity or plenum configuration suitable for making the shaft 12. Against the inner surfaces of each half of the mold 50 are laid the first three layers, firstly, the third six-ounce fiberglass cloth layer wrap 25, secondly, the second graphite tow 25 layer and thirdly, the first layer wrap 23 of fiberglass cloth of the same variety as the third layer 25. These are systematically laid in the cavity of the mold so that each of the layers rest against the cavity walls and over the mold flanges 51' and 52' respectively of each of the two halves as clearly shown. Thereafter, in each of the halves, the polyurethane foam, in liquid form, is poured to fill the cavity of each of the two halves and the two halves 51 and 52 are sandwiched against the longitudinal spline 21 placed therebetween as shown in the cross-sectional FIG. 6. The curing of the polyurethane core 22 takes in about 30 seconds or less and becomes hard and binds to the spline 21 and wraps 23, 24, and 25 to a lesser or greater extent. On full curing of the polyurethane foam, the shaft 12' is removed from the core mold 50 and the upper and lower flashings or excesses 21U and 21L of the spline, and of the wraps 23, 24 and 25, as well as the excess cured polyurethane foam 22 which might be congealed in the flashings, are shaved and sanded away by appropriate cutters and sanders. Note that the seams of the mold 50 result in mold flashings that are parallel to the spline 21.

Figure 7:
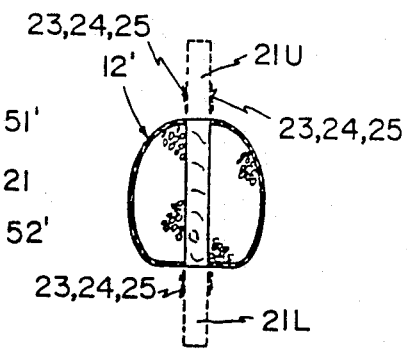
FIG. 7 is a section through the partially completed shaft after core molding but prior to the resin transfer molding step according to the invention.
Figure 8:
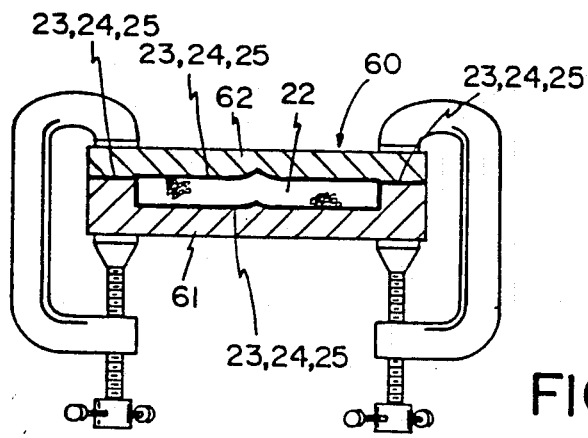
FIGS. 8 and 9 are corresponding figures to that of FIGS. 6 and 7 in relation to the fabrication of the paddle portion of the oar.
Figure 9:
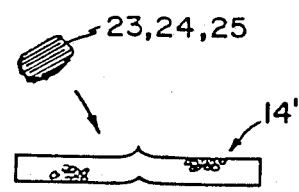
Figure 10:
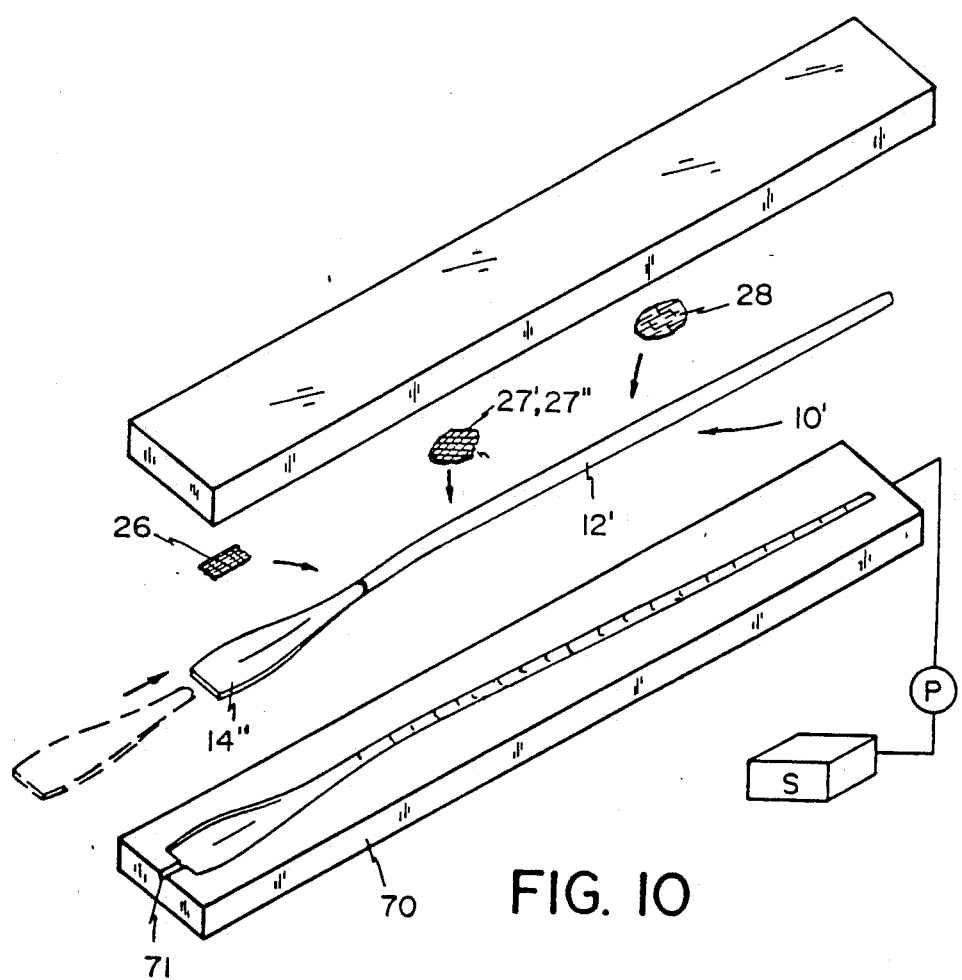
FIG. 10 is an assembly view of the resin transfer mold and oar assembly fabricating step according to the invention.

In a somewhat similar fashion, the paddle portion is formed using a paddle mold 60 where the lower half or portion 61 defines the cavity while the upper portion or cap 62 closes the same. In a similar fashion, the three layers 23, 24, and 25 are laid, firstly, into the core cavity 61;, the cavity filled with polyurethane, the wraps 23, 24, and 25 again placed over the filled cavity and then the top portion 62 placed on the mold and clamped. Curing takes place and thereafter the paddle can be removed and the excess flashings trimmed from the edges. Alternatively, and referring to FIG. 9, the wraps 23, 24, and 25 can be put on after the paddle 14' has been molded in the mold 60 (assuming the wraps were not put in the core cavity prior to molding). As will become apparent, this "green paddle", no matter how fabricated but I prefer to place the wraps 23, 24, and 25 in the paddle mold prior to placing the polyurethane liquid therein, is 14" in FIG. 10, is attached to the green shaft 12' achieved from the molding operation of FIGS. 5 and 6 and after the cleaning and trimming operation of FIG. 7. This is achieved as follows.

Referring to FIG. 10 the green paddle portion 14" is abutted to the green shaft 12' and the tape 26 is placed longitudinally end to end over the upper curved surface portion of the shaft 12 and paddle face 14 so as to also cover the spline 21 and a portion of the underlying wraps 25 adjacent to the spline 21 as seen in FIG. 4 and as earlier described. Fiberglass wraps 27' and 27" are helically wound from paddle end to handle end and then a run of graphite cloth 28 is helically wound from paddle to handle to encapsulate everything and form the assembled green oar 10' that is now ready to be placed within the resin transfer mold 70 of FIG. 10 whose cavity is configured to the ultimate external architecture of the oar 10. The green oar 10' is placed in the mold 70 and the mold 70 closed and sealed and thermo-setting resin is transferred into the mold through pump P from a source S and air removed, by appropriate means, for example as by a bleed port 71' communicating with the core of the mold 70 and located at the distal end of the paddle. The thermo-setting resin inserted is known as 2T031 TM from the same MIA CHEMICAL LIMITED. The resin having been inserted under pressure, the temperature of the core mold 70 is subsequently elevated to appropriately 200° F. (98° C.) for an appropriate curing time and then the mold 70 and contents cooled and the finished oar 10 removed. The resin has the property that on heating first flows and cures and thereafter solidifies binding all the wraps 23 through 28 with the resin 29 to form a rigid skin with the integral structure for the oar. After cooling, the oar is removed and the mold flashings, which are now orthogonal to the spline 21, are sanded away by hand. A number of coats of resin are painted over the handle portion with sawdust or other wooden products in flake or granular form sprinkled thereon after each coating prior to drying. The wooden product absorbs the wet resin and binds itself to become part of the skin 20. This application, if performed three or four times, provides an ideal pebbly texture to the handle and a smooth polished surface to the exterior surface shaft and paddle. The oar is complete.

Figure 11:
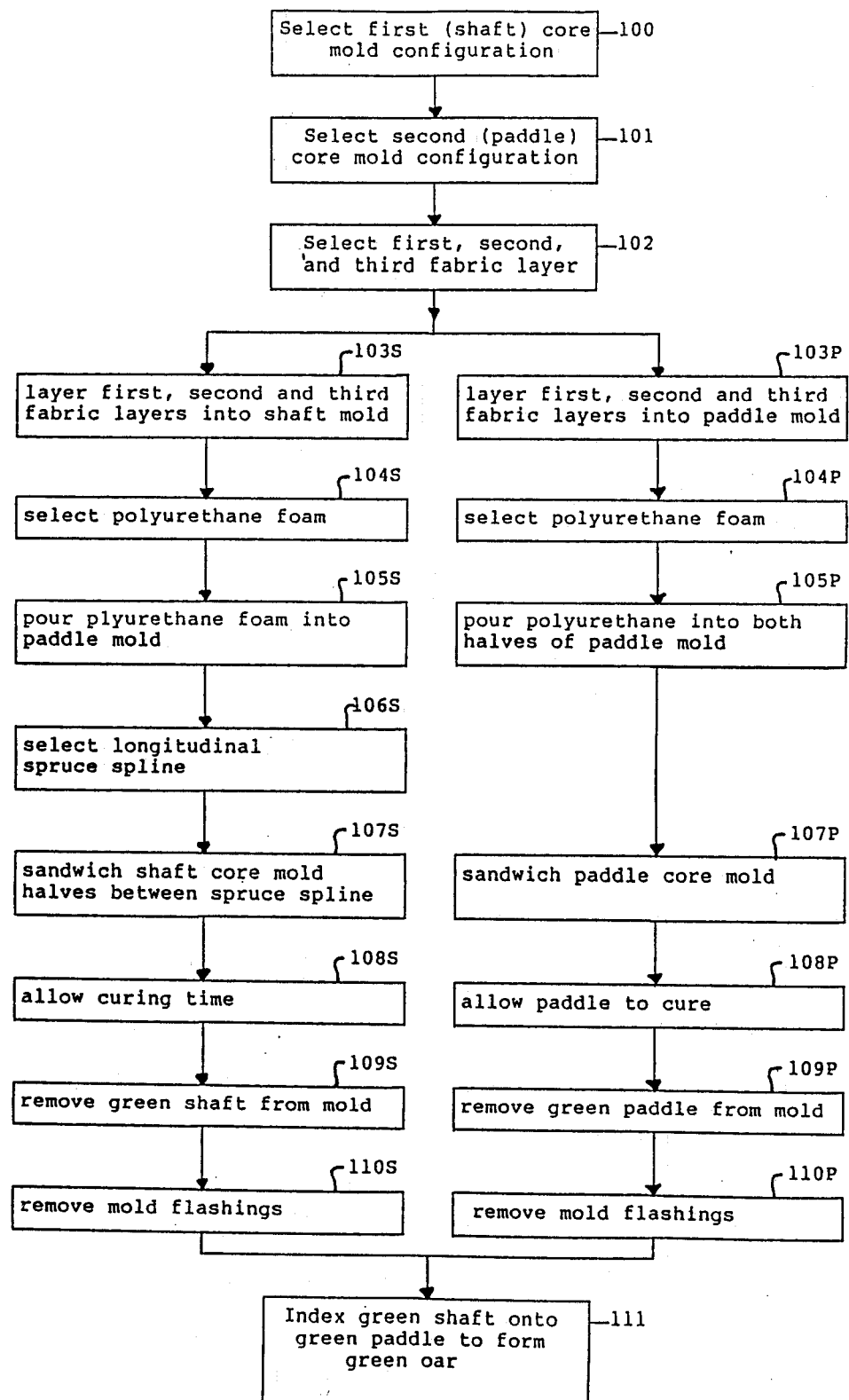
FIGS. 11 and 12 are a flow chart of the preferred method of fabrication.
Figure 12:
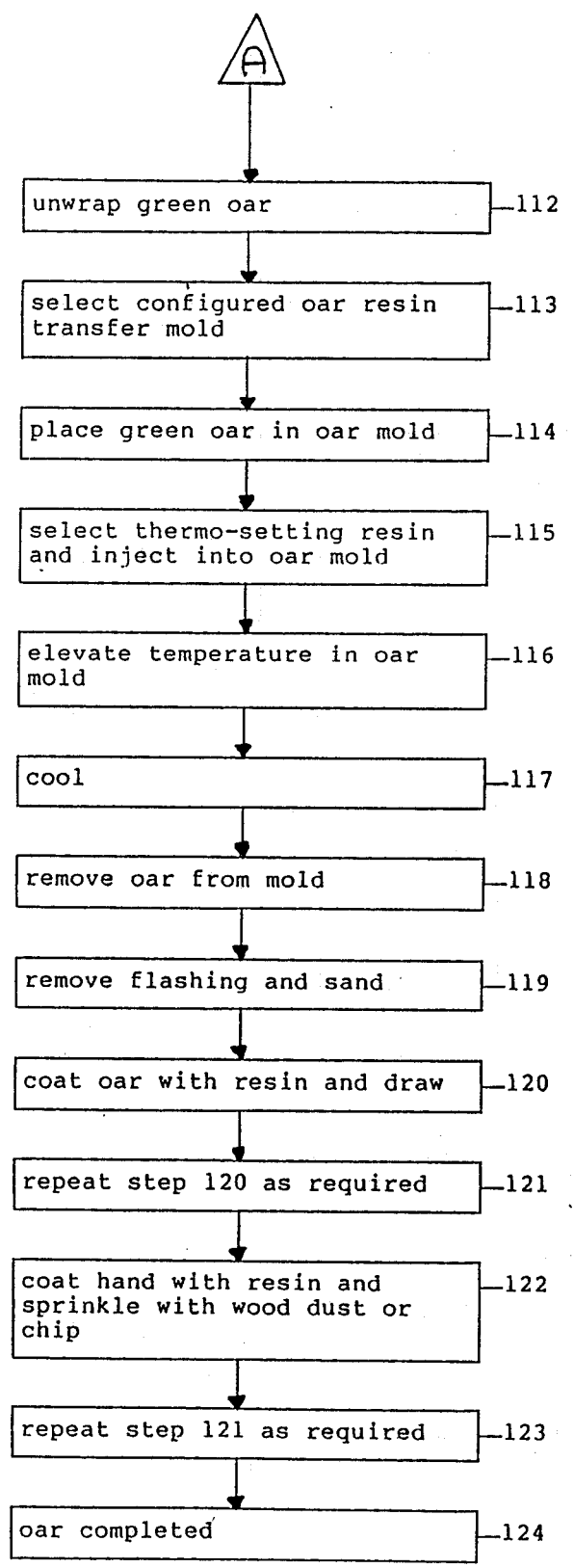

A detailed flow chart of the method of fabrication and as described aforesaid is shown in FIGS. 11 and 12.

The embodiments of the invention in which an exclusive property or privilege is claimed are defined as follows:

1. A unitary oar including a paddle transforming into a shaped shaft that at its opposite end carries a handle portion the oar comprising a shaped paddle having a concave front surface and convex back that at its upper end smoothly merges with the shaft, said shaft having a thickness which increases from adjacent said paddle to the longitudinal center of said shaft, and then decreases in thickness from said longitudinal center to the distal end of said shaft to define the handle portion, said handle portion having a gripping surface thereover, the shaft in section, throughout the handle portion being a cylinder; the oar including;
    (a) a smooth outer skin of resin impregnated fiberglass tape and cloth and encircling graphite cloth, and;
    (b) an inner core of polyurethane foam that carries in the longitudinal direction and coincident with the longitudinal axis of the paddle a rib member extending essentially from the paddle throughout the extent of the shaft to the handle.

2. The oar as claimed in claim 1 wherein the shaft depicts, in section, an oblate ellipse from paddle through the mid point to the handle portion where at the handle portion the shaft in section depicts a tapered cylinder.

3. The oar as claimed in claim 2 wherein the rib member is sitka spruce.

4. The paddle as claimed in claim 2 wherein the rib member has juxtaposed on opposite surfaces polyurethane foam and that are enwrapped by a sheet of graphite fabric.

5. The oar as claimed in claim 2 wherein the handle portion comprises a pebbly surface suitable for gripping.

6. The oar as claimed in claim 2 wherein the handle portion comprising an exterior pebbly surface of fibrous wood products impregnated in resin.

7. The oar as claimed in claim 2 wherein the outer skin includes a first fiberglass layer, a second layer of carbon tow, a third fiberglass layer, a fourth run of tape material over the rib member and partially covering first, second and third layers, a fifth helical wrap of unidirectional fiberglass, and a sixth helical wrap thereover of the same material, and a seventh helical wrap of fiberglass cloth the later three layers impregnated with said resin.

8. The oar as claimed in claim 7 wherein the resin is thermo-setting.

9. The oar as claimed in claim 7 wherein the resin is thermo-setting.

10. The paddle as claimed in claim 1 wherein the rib member has juxtaposed on opposite surfaces polyurethane foam and that are enwrapped by a sheet of graphite fabric.

11. The oar as claimed in claim 1 wherein the handle portion comprises a pebbly surface suitable for gripping.

12. The oar as claimed in claim 1 wherein the handle portion comprising an exterior pebbly surface of fibrous wood products impregnated in resin.

13. The oar as claimed in claim 1 wherein the outer skin includes a first fiberglass layer, a second layer of carbon tow, a third fiberglass layer, a fourth run of tape material over the rib member and partially covering first, second and third layers, a fifth helical wrap of unidirectional fiberglass, and a sixth helical wrap thereover of the same material, and a seventh helical wrap of fiberglass cloth the later three layers impregnated with said resin.

14. The oar as claimed in claim 13, wherein the resin is thermo-setting.

15. A method of making a composite unitary oar having a shaft and paddle and suitable for use in scull racing comprising:
  (a) selecting a first and second core mold;
    (i) the first core mold comprising two pieces jointly defining a cavity configured into the exterior profile of the shaft of the oar; and
    (ii) the second core mold having two pieces jointly configured to define a cavity for the paddle of the oar;
  (b) selecting as a first and a third layer, a fiberglass cloth and as a second layer carbon tow fabric;
  (c) layering said first, second and third cloths and fabric into the core cavities of a piece of the first and second core molds;
  (d) selecting polyurethane foam and pouring the same into each of said partial cavities over the first, second and third layers;
  (e) selecting a longitudinal rigid member as a spline and placing the same over one of said pieces of the first core mold;
  (f) sandwiching the respective pieces of the core molds together so that the first core mold sandwiches the spline therebetween and allowing each core mold to cure its respective contents and to respectively create a green paddle or green shaft;
  (g) removing the green paddle from its core mold and green shaft from its core mold;
  (h) removing mold flashings from the green paddle and green shaft;
  (i) abutting the green paddle and green shaft together and enwrapping the same end to end with helical winds of synthetic material to form a unitary green oar;
  (j) placing the green oar into a resin transfer mold whose cavity is configured for the ultimate exterior profile of the oar;
  (k) selecting a thermo-setting resin and injecting the same into the resin transfer mold; and,
  (l) elevating the temperature of the resin transfer mold to cure the resin and to create a unitary oar with shaft and integral paddle.

16. The method as claimed in claim 15 wherein the removing step (h) also removes the excess spline which extends beyond the prolongation of the cured polyurethane core.

17. The method as claimed in claim 16 including the additional step of:
  removing the resin flashing resulting from the temperature elevating and curing step (1).

18. The method as claimed in claim 17 including the additional step of:
  coating the exterior surface of the oar with a resin and allowing the same to dry.

19. The method as claimed in claim 17 including the additional step of:
  coating the exterior surface of the oar with a resin and allowing the same to cure; and,
    sprinkling saw dust over the handle portion of the shaft while the resin is wet so that the resin impregnates the saw dust and thereafter on drying of the resin binds the saw dust to the hardened resin to thereby create a pebbly surface in the handle portion and a smooth surface along shaft and paddle portion of the oar.

20. The method as claimed in claim 16 including the additional step of:
  coating the exterior surface of the oar with a resin and allowing the same to dry.

21. The method as claimed in claim 16 including the additional step of:
  coating the exterior surface of the oar with a resin and allowing the same to cure; and,
    sprinkling saw dust over the handle portion of the shaft while the resin is wet so that the resin impregnates the saw dust and thereafter on drying of the resin binds the saw dust to the hardened resin to thereby create a pebbly surface in the handle portion and a smooth surface along shaft and paddle portion of the oar.

* * * * *